US006296032B1

(12) United States Patent
Louie et al.

(10) Patent No.: US 6,296,032 B1

(45) **Date of Patent: *Oct. 2, 2001**

(54) LAMINATOR PRINTER

(75) Inventors: Danny Louie, Monterey Park; Faustin Marentes, Montebello, both of CA (US)

(73) Assignee: Zih Corp., Wilmington, DE (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/160,827

(22) Filed: Sep. 25, 1998

Related U.S. Application Data

(60) Provisional application No. 60/060,074, filed on Sep. 26, 1997.

(51) Int. Cl.[7] ........................................ B32B 31/18

(52) U.S. Cl. ........................ 156/387; 156/277; 156/384; 156/522; 156/552; 156/555

(58) Field of Search ........................ 156/267, 269, 156/277, 384, 387, 522, 552, 555, 582, 583.1

(56) References Cited

U.S. PATENT DOCUMENTS

| | | | | |
|---|---|---|---|---|
| 3,413,171 | * | 11/1968 | Hannon | 156/277 |
| 4,100,011 | * | 7/1978 | Foote | 156/277 X |
| 4,287,285 | * | 9/1981 | Mosehauer | 156/277 X |
| 4,770,078 | | 9/1988 | Gautier | 83/344 |
| 4,999,075 | * | 3/1991 | Coburn, Jr. | 156/209 |
| 5,239,926 | | 8/1993 | Nubson et al. | 101/487 |
| 5,250,133 | * | 10/1993 | Kawamura et al. | 156/240 |
| 5,637,174 | | 6/1997 | Field et al. | 156/256 |
| 6,030,474 | * | 2/2000 | Isono et al. | 156/64 |

FOREIGN PATENT DOCUMENTS

WO 96.32255 10/1996 (WO) ........................ B32B/31/00

* cited by examiner

*Primary Examiner*—James Sells

(74) *Attorney, Agent, or Firm*—Fulbright & Jaworski L.L.P.

(57) ABSTRACT

A laminator/printer for laminating, cleaning, imprinting and trimming print media, capable of printing on the print media and the laminate with a single print head.

52 Claims, 6 Drawing Sheets

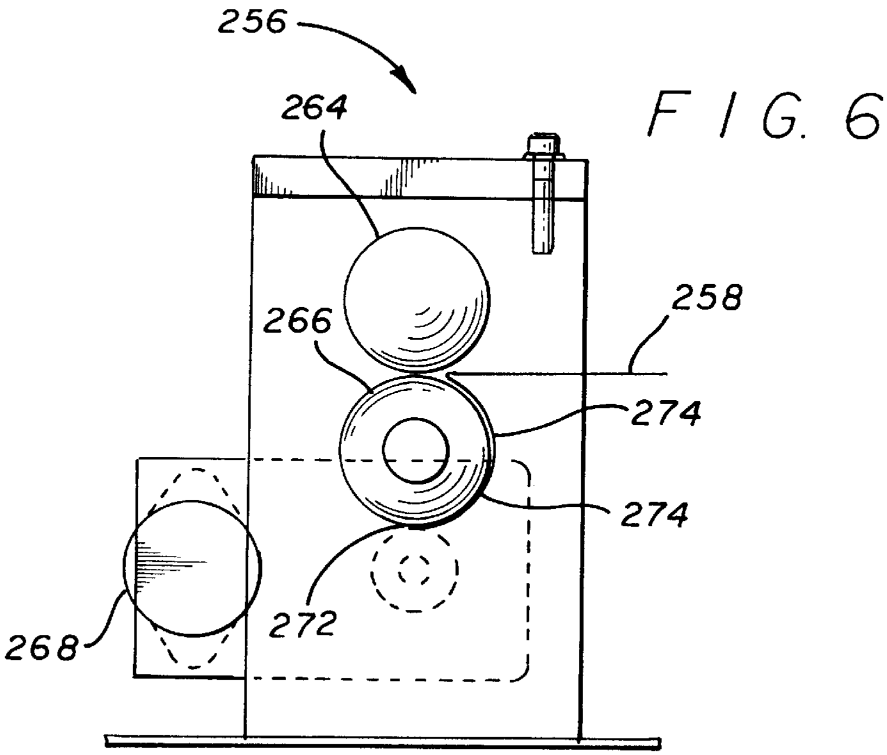
FIG. 6
FIG. 7
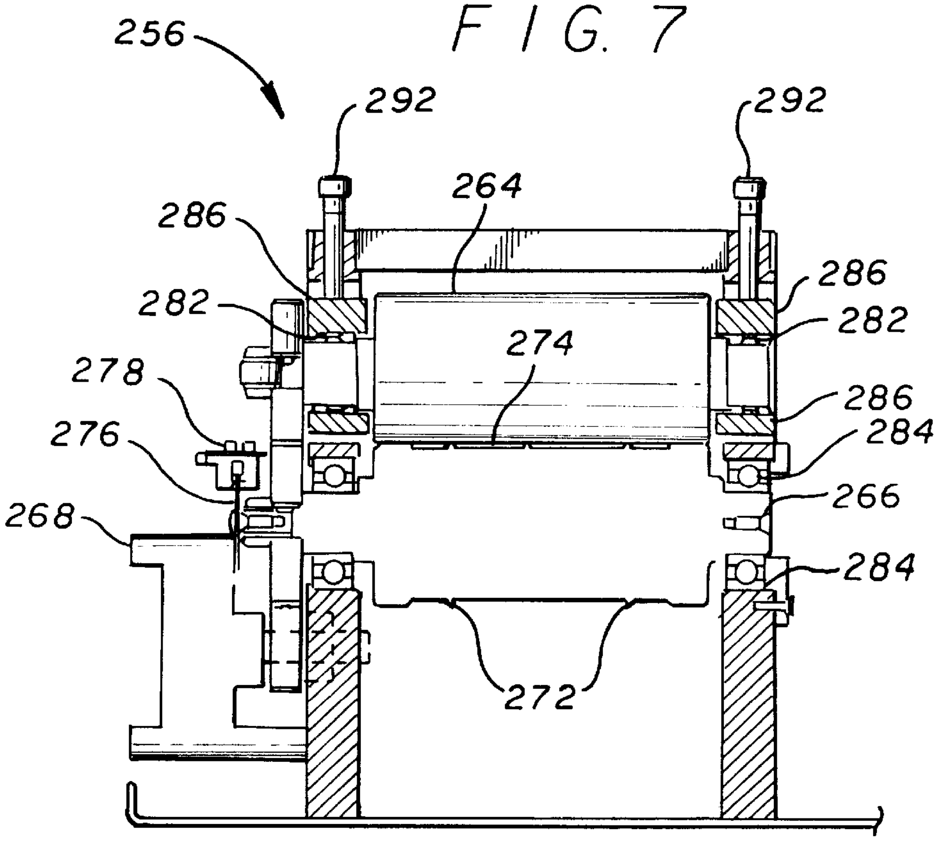

LAMINATOR PRINTER

This application is based upon provisional patent application Ser. No. 60/060,074 which was filed in the United States Patent and Trademark Office on Sep. 26, 1997.

TECHNICAL FIELD OF THE INVENTION

The invention relates to printing and laminating devices, more particularly to devices for printing on cards and on laminate and fusing the two together through a lamination process.

BACKGROUND OF THE INVENTION

Laminated, printed cards are required in such diverse applications as drivers' licenses, employee identification badges, business promotional cards, convention credentials, and in a host of other uses. Typically, such cards consist of an opaque card laminated on one side with a clear plastic laminate. Users of these cards often want the eye-pleasing effect of information printed on both the clear laminate and the card itself, with at least one side printed in multiple colors. This allows information to be visible on two sides of the finished product, the back side of the opaque card, and on the side of the laminate attached to the opaque card. The typical card stock used for the opaque card is a heavy plastic, which does not accept most printing dyes easily. Thus, it is most efficient to print the opaque card stock with a single color resin, and use multi-colored dyes on the more flexible clear plastic laminate. Unfortunately, this necessitates two printing mechanisms, one to imprint resin on the opaque card and another to imprint the often multi-colored dyes on the clear card. The use of the duel print head adds expense to the process and reduces speed. Additionally, the second print head reduces reliability, as a far more complex mechanism has to be developed to handle the two cards.

Additionally, once the two card are printed, it is important that they be precisely aligned just before and during the lamination process. Obviously, if they are not properly aligned, the printing on one side will not match the orientation or angle of the printing on the opposite side. Prior art devices have utilized moving clamps for this purpose, which stay (and move) with the cards as they go through the lamination process. This reduces the speed and increases the complexity of such systems. Additionally, this requires a larger card than is necessary, for the area under the clamp typically is not properly laminated and must be trimmed off.

Another problem with prior art laminators is that they use a stainless steel metal belt that is spread between two rollers to fuse the clear plastic to the opaque card. Such systems require that the laminated card be stopped and placed under the metal belt, decreasing speed and efficiency. Additionally, such systems are prone to jamming due such complex stopping and starting. Another disadvantage of the stainless steel belt is a great deal of heat is spread over a relatively large surface, heating up the entire unit and potentially damaging bearings and other parts.

A further problem in prior art systems is the trimming mechanism at the end of the process, in which a reciprocating dye cutter is utilized to perform the final trimming of the card. Such systems are expensive and take up a great deal of space. Additionally, the result is a rough, somewhat uneven edge. A further disadvantage of the punch-type cutter is that they cannot perform fine trimming, and require that a great deal of excess be left around the card, resulting in the waste of a great deal of material.

Yet another problem with prior art machines, is that both the clear and opaque cards often attract lint and other debris due, for instance, to static electricity. If this debris is present during the printing process, printing will become uneven, and possibly sections of the card will not be printed. Prior art devices have used complicated mechanisms that use a cleaning roller that is intermittently cleaned by some sort of cleaning element. This intermittent cleaning may either be automatic or performed when the operator notices a problem. Obviously, such systems allow problems to occur in between the cleanings.

What is needed is a printer laminator that will print both opaque cards and transparent laminate with a single print head, continuously clean the cards, laminate without the use of an elongated metal belt and clamps, and trim the resultant laminated card smoothly, even if there is very little excess to be trimmed.

SUMMARY OF THE INVENTION

The present invention provides a device for printing on a print media and laminating the print media to thermoplastic material. In a first embodiment, the present invention provides input means print means having a single print head capable of printing on both the thermoplastic material and on the print media, lamination means and output means for directing the laminated product out of the printer laminator. The lamination means may also comprise a heated roller. The printer laminator may also comprise In a second embodiment, the present invention provides a printer cleaning mechanism having a cleaning roller, a drive roller and a cleaning core. The cleaning mechanism further comprises a motor means and a removable adhesive surface.

In another embodiment, the present invention provides a cutter means having a rotating cutter comprising a circumferential cutting blade, a rotating anvil, a friction area on the surface of the rotating cutter, and a motor means. The cutter means also comprises a deformable pad.

These and other features and advantages of this invention will become further apparent from the detailed description and accompanying figures that follow. In the figures and description, numerals indicate the various features of the invention, like numerals referring to like features throughout both the drawings and the description.

BRIEF DESCRIPTION OF THE DRAWINGS

FIG. 6 is a schematic front view of the die-cutter portion of the printer-laminator of the present invention.

FIG. 7 is a schematic side view of the die-cutter portion of the printer-laminator of the present invention.

DETAILED DESCRIPTION OF THE PREFERRED EMBODIMENT

Figure 1:
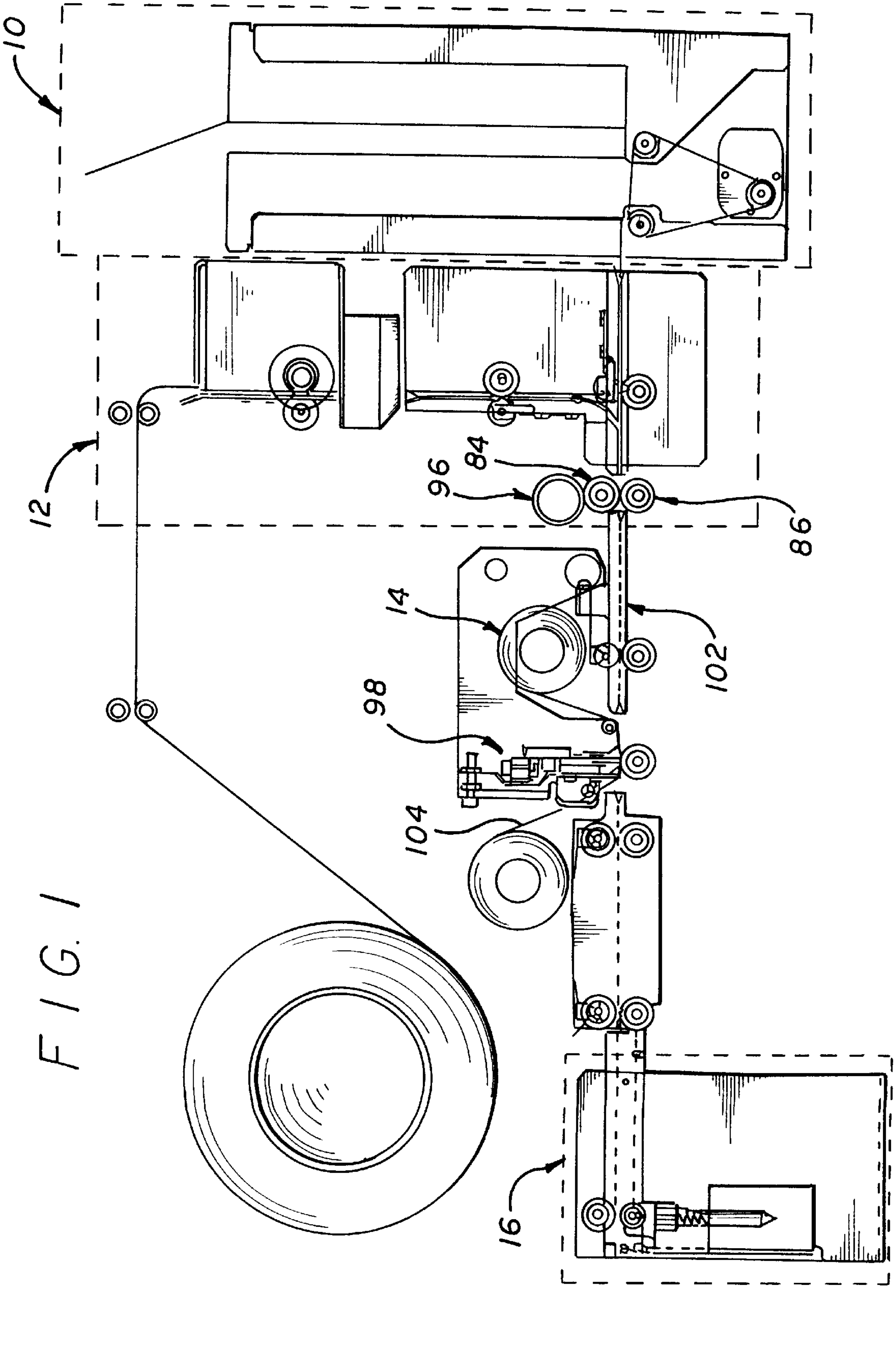
FIG. 1 is a schematic view of the card stack feeder, entry mechanism, printer mechanism and exit mechanism of the printer-laminator of the present invention, with the printer mechanism shown in greater detail.

FIG. 1 shows a printer-laminator constructed according to the present invention. The printer-laminator includes a card stack feeder 10 for storing unprinted card stock (not shown) and feeding the card stock into the printer-laminator, an entry mechanism 12 for cutting clear PVC material into card stock size and feeding the cut pieces into the printer-laminator, a printer mechanism 14 for printing on the card stock and the clear PVC material, an exit mechanism 16 for trimming the card stock and urging it out of the printer-laminator, a laminator mechanism 18 (FIG. 5) for laminating the PVC to the card stock (see FIG. 5), and a die-cutter die-cutter mechanism 256 (FIGS. 6 and 7) for trimming the resulting laminated card to the desired dimensions. The printer-laminator of the present invention both prints and laminates cards, such as business cards, security identification cards, drivers licenses, and the like.

Figure 2:
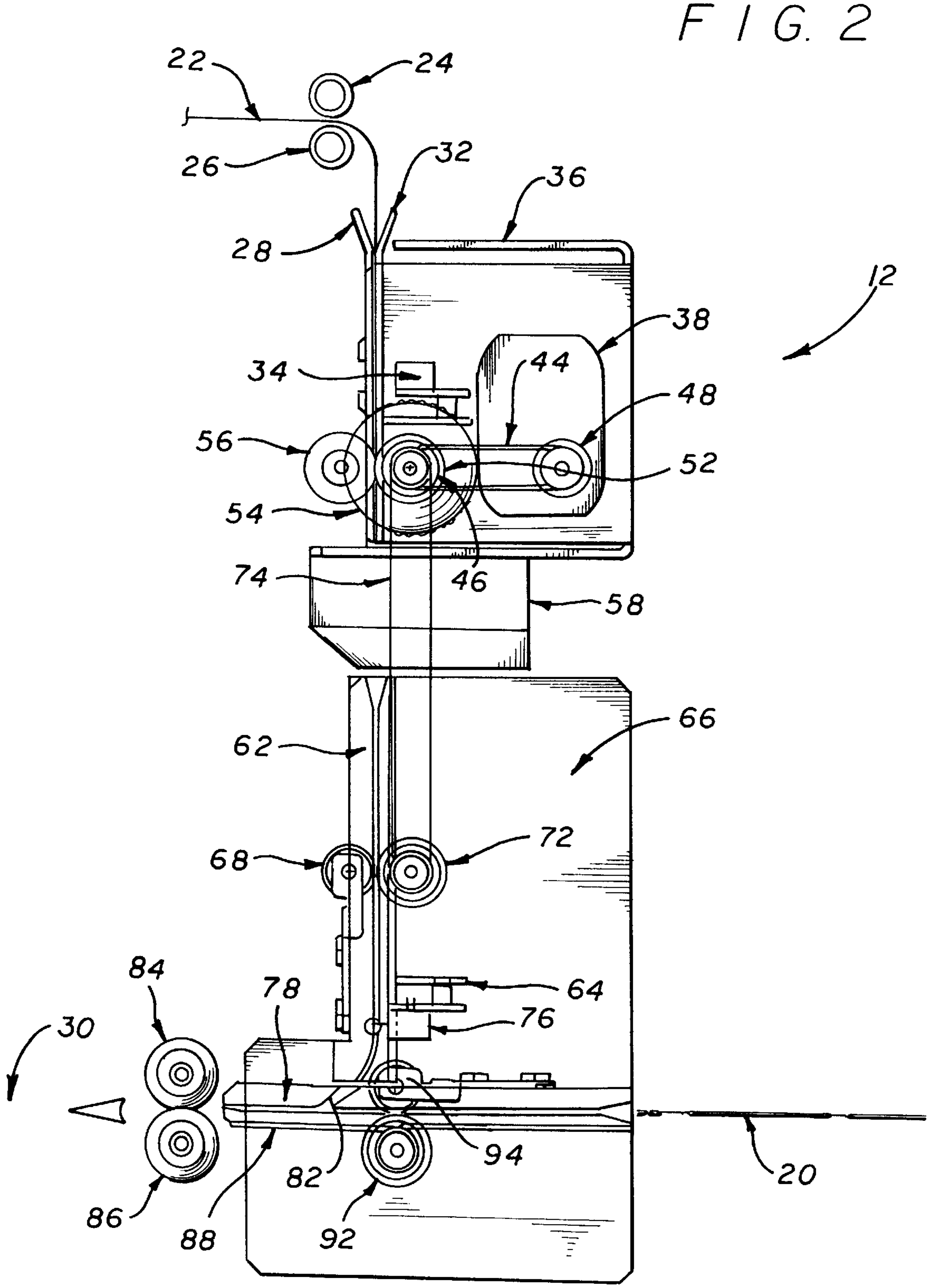
FIG. 2 is an expanded schematic view of the entry mechanism of FIG. 1.

Referring to FIGS. 1 and 2, the present invention utilizes precut card stock, typically opaque, referred to as a white chip card 20 which is stored in the card stack feeder 10, and clear PVC material 22. The white chip card 20 can be made of any number of materials, and in a preferred embodiment, it is made of polyester. The clear PVC material 22 is typically in a roll form. It has been found that a product made by Minnesota Mining and Manufacturing, measuring about 0.008 inches thick and about 64.0 mm wide, is well suited for this function. The clear PVC material 22 is feed between two Teflon® rollers, 24 and 26.

The leading edge of the clear PVC material 22 is placed into the opening between an upper stainless steel plate 28 and a lower stainless steel plate 32. The gap between upper stainless steel plate 28 and lower stainless steel plate 32 is about 0.020 in. A reflective sensor 34, for sensing a reflection on the clear PVC material 22 and generating an electrical signal in response thereto, is mounted to lower stainless steel plate 32 for detecting the presence of the clear PVC material 22. It has been found the Aleph OH-1021 reflective sensor is well suited for this application.

The upper stainless steel plate 28 and lower stainless steel plate 32 are rigidly attached to a cutter bracket 36, for mounting a mechanism for cutting the clear PVC material 22 into PVC clear chip cards 30. The cutter bracket 36 may be made of any number of materials. However, it has been found that zinc-plated steel is quite effective. The cutter bracket 36 is rigidly attached to and supports a first gearmotor 38, such as the Buehler 1.61.065.343 18VDC gearmotor. The first gearmotor 38 is mounted to a motor pulley 48, typically a zinc-casted 16-tooth pulley. The motor pulley 48 drives a timing belt 44, which in a preferred embodiment is a kevlar-reinforced polyurethane 50-tooth timing belt. The timing belt 44 in turn drives a drive pulley 46, which may be a zinc-casted 16-tooth pulley. The drive pulley 46 is mounted to a silicone roller drive shaft 52, and a thumb knob 54. Rotatably mounted to the upper stainless steel plate 28 is an Ethylene Propylene Diene Monomer (EPDM) pressure roller, such as pressure roller 56, which traps the clear PVC material 22 between the pressure roller 56 and the silicone roller drive shaft 52. When loading clear PVC material 22 into the present invention, the thumb knob 54 may be used to turn the thumb knob 54, which rotates against the clear PVC material 22 and the drive pulley 46, urging the clear PVC material 22 further into the device.

The action of the thumb knob 54 (during loading) or the first gearmotor 38 (during operation) drives the clear PVC material 22 further into the machine, past a cutter 58 (described below), into and between a pair of clear entry guides, such as clear entry guides 62. The clear entry guides 62 can be made of any number of acetyl resins, such as Delrin®. The clear entry guides 62 are mounted to a stainless steel clear entry shroud plate 64, and against a zinc-plated steel entry mechanism plate 66, with M3 self tapping screws. The clear PVC material 22 is captured by the clear entry guides 62, and passes between a second EPDM pressure roller 68 and a second silicone drive roller shaft 72. The second silicone drive roller shaft 72 is driven by a second timing belt 74, ideally a kevlar-reinforced polyurethane 105-tooth timing belt. The second timing belt 74 is driven by the drive pulley 46 and thus the first gearmotor 38.

The clear PVC material 22 is thus urged by the second silicone drive roller shaft 72 against the second EPDM pressure roller 68 further into the device. A reflective sensor 76, for sensing the reflection from the clear PVC material 22 and generating an electronic signal in response thereto is also provided, ideally an Aleph OH-1021 reflective sensor, positioned approximately 98.0 mm from the cutter 58 so as to measure off cut pieces about 98 mm long. When the edge of the clear PVC material 22 is detected by the reflective sensor 76, the cutter 58 is activated to cut the roll of clear PVC material 22 into a PVC clear chip card 30, of about 98.0 mm long (and called a "chip"). The cut PVC clear chip card 30 proceeds down the clear entry guides 62, by the second silicone drive roller shaft 72, into a delrin white entry guide 78. The delrin white entry guide 78 is attached to the entry mechanism plate 66. The PVC clear chip card 30 flexes around the curved exit 82 of the clear entry guides 62 and the delrin white entry guide 78, towards a cleaning mechanism, as described below.

Referring to FIGS. 1 and 2, both the white chip card 20 and the PVC clear chip card 30 are susceptible to lint, dust and other debris due to factors such as static electricity. Such debris will interfere with the printing process in a number of ways, including resulting in breaks in the printed material. Thus, the present invention provides a cleaning mechanism, consisting of a silicone cleaning roller 84, for cleaning the chip, a silicone clean drive roller 86, and a cleaning core 96 (FIG. 1) for removal of debris from the silicone cleaning roller 84. The silicone cleaning roller 84 may be made of any non adhesive material that will nonetheless adhere to debris on the cards. A slightly deformable rubber roller has been found to be particularly effective for this purpose.

The cleaning core 96 is preferably composed of an ABS tubing with an inside diameter of about 20 mm, an outside diameter of about 24 mm and an overall length of about 56 mm. An adhesive surface (not shown), such as double-sided synthetic adhesive paper tape (for instance, Anchor 591) is applied to the outside surface of this tubing with no tape overlap. A top liner (not shown) is included and is removed prior to installation to expose the adhesive means, which makes contact with the silicone cleaning roller 84. When a white chip card 20 or a PVC clear chip card 30 passes between silicone clean drive roller 86 and the silicone cleaning roller 84, it transmits rotational movement from the silicone clean drive roller 86 to the silicone cleaning roller 84. The cleaning core 96 turns in the opposite direction as the silicone cleaning roller 84, continuously contacting and cleaning the silicone cleaning roller 84. The cleaning core 96 can provide continuous cleaning for about 1000 cards.

The delrin white entry guide 78 is attached to a shroud plate 88. Once the PVC clear chip card 30 engages the silicone cleaning roller 84 and the silicone clean drive roller 86, the two rollers (driven by the step motor of the print engine—discussed below) become the driving motion of the clear PVC cut chip.

After the PVC clear chip card 30 has passed through the silicone cleaning roller 84 and silicone clean drive roller 86, a white chip card 20 is fed into delrin white entry guide 78 from the card stack feeder 10. In a preferred embodiment, the white chip card 20 is about 64.0 mm wide by 98.0 mm long by 0.022 in. thick. The white chip card 20 may be made of any number of materials, but typically a polyester material supplied by 3M. The card stack feeder 10 feeds the white chip card 20 into the delrin white entry guide 78 automatically. Such automatic card feeders are well known in the art, such as the unit produced by Asahi Seiko. The white chip card 20 is feed through the delrin white entry guide 78 by the third silicone drive roller 92, against a third EPDM pressure roller 94. The white chip card 20 then engages the silicone cleaning roller 84 and the silicone clean drive roller 86, which feeds the white chip card 20 into the print engine to print the monochrome Kresin image onto the white chip card 20.

Figure 3:
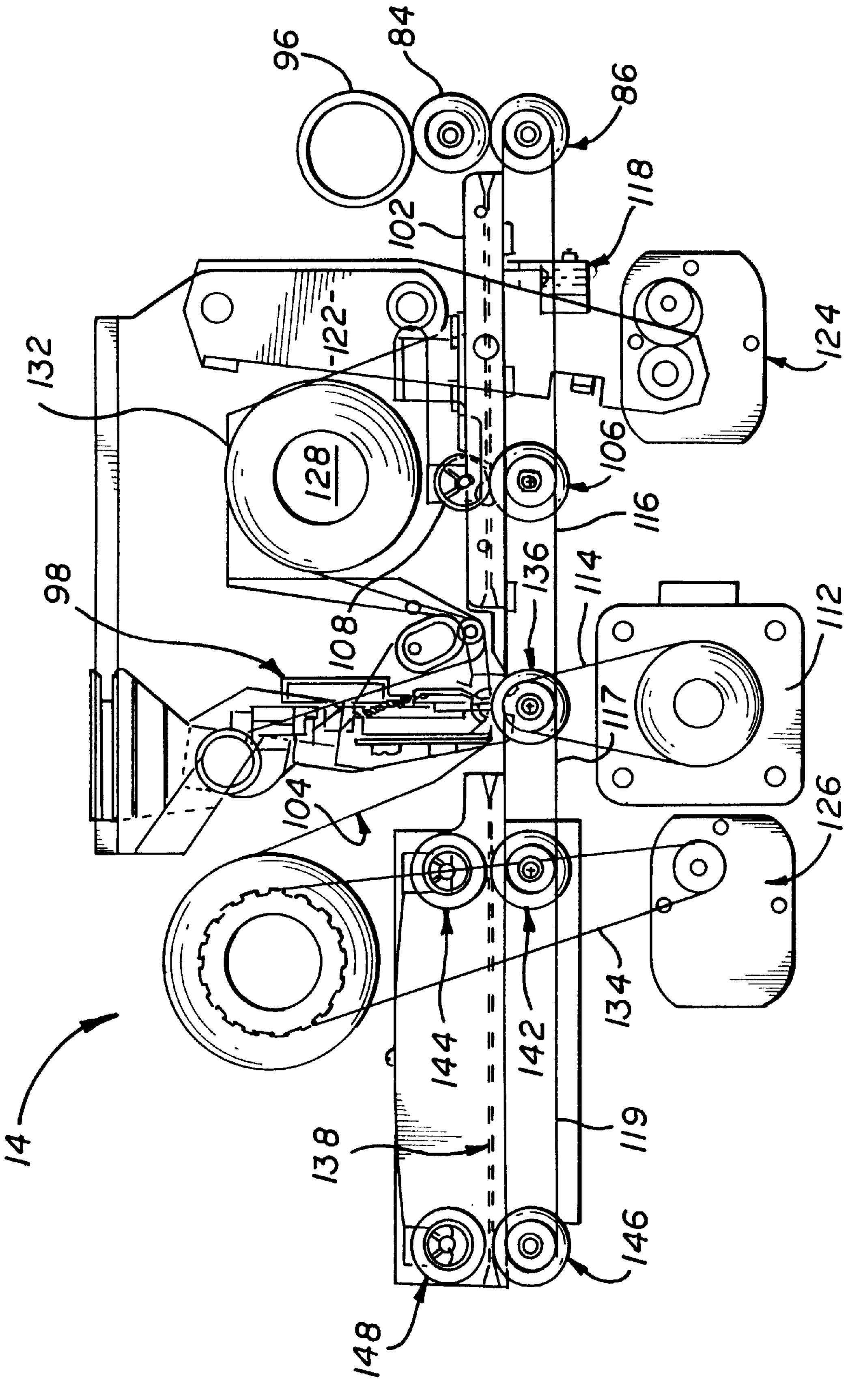
FIG. 3 is an expanded schematic view of the printer mechanism of FIG. 1.

Referring to FIG. 3, after being urged into the printer mechanism 14 by the silicone clean drive roller 86, the PVC clear chip card 30 is subjected to the color dye-sublimation printing process. The PVC clear chip card 30 is transported through delrin card guides 102 to the print head assembly 98 via silicone clean drive roller 86 and drive roller 106. Drive roller 106 opposes free roller 108, which like silicone clean drive roller 86, is driven by step motor 112, ideally a Sanyo-Denki 103-546-6842 step motor, via timing belts 114 and 116.

A photo-reflective sensor 118, such as one made by Aleph (model OH-1021), is provided to detect the end of the PVC clear chip card 30. Once the rearward edge of the PVC clear chip card 30 is detected by the photo-reflective sensor 118, the step motor 112 is started and stopped (as well as reversed) to place the PVC clear chip card 30 in position with the portion of the PVC clear chip card 30 being printed under print head assembly 98. The print head assembly 98 may comprise any number of a commercially available print heads, such as the Kyocera thermal edge-type print head. The print head assembly 98 drops down onto the PVC clear chip card 30 via a cam mechanism 122 controlled and powered by a gearbox motor 124, such as the Buehler direct current gearbox motor. The print head assembly 98 preferably comprises a Kyocera thermal edge-type print-head, which applies heat to transfer dye ink and resin wax from a ribbon 104, such as the multi-color ribbon from Dai Nippon. The ribbon 104 is divided into differently colored portions. In a preferred embodiment, the ribbon 104 has 250 segments, each segment comprising three colored lengths and a resin wax length. Thus one segment will imprint one white chip card 20 (in three colors) and one PVC clear chip card 30 (in a single color using resin wax). The ribbon 104 is advanced forward during the printing process by a second gearbox motor 126 via a timing belt 134. Tension is applied to the ribbon 104 during printing by a felt washer-compression spring clutch 128 on a plastic supply spindle 132, which serves as a take up reel. The portion of the ribbon 104 having the desired color is moved under the print head assembly 98 by the counterclockwise rotation of the second gearbox motor 126.

Figure 4:
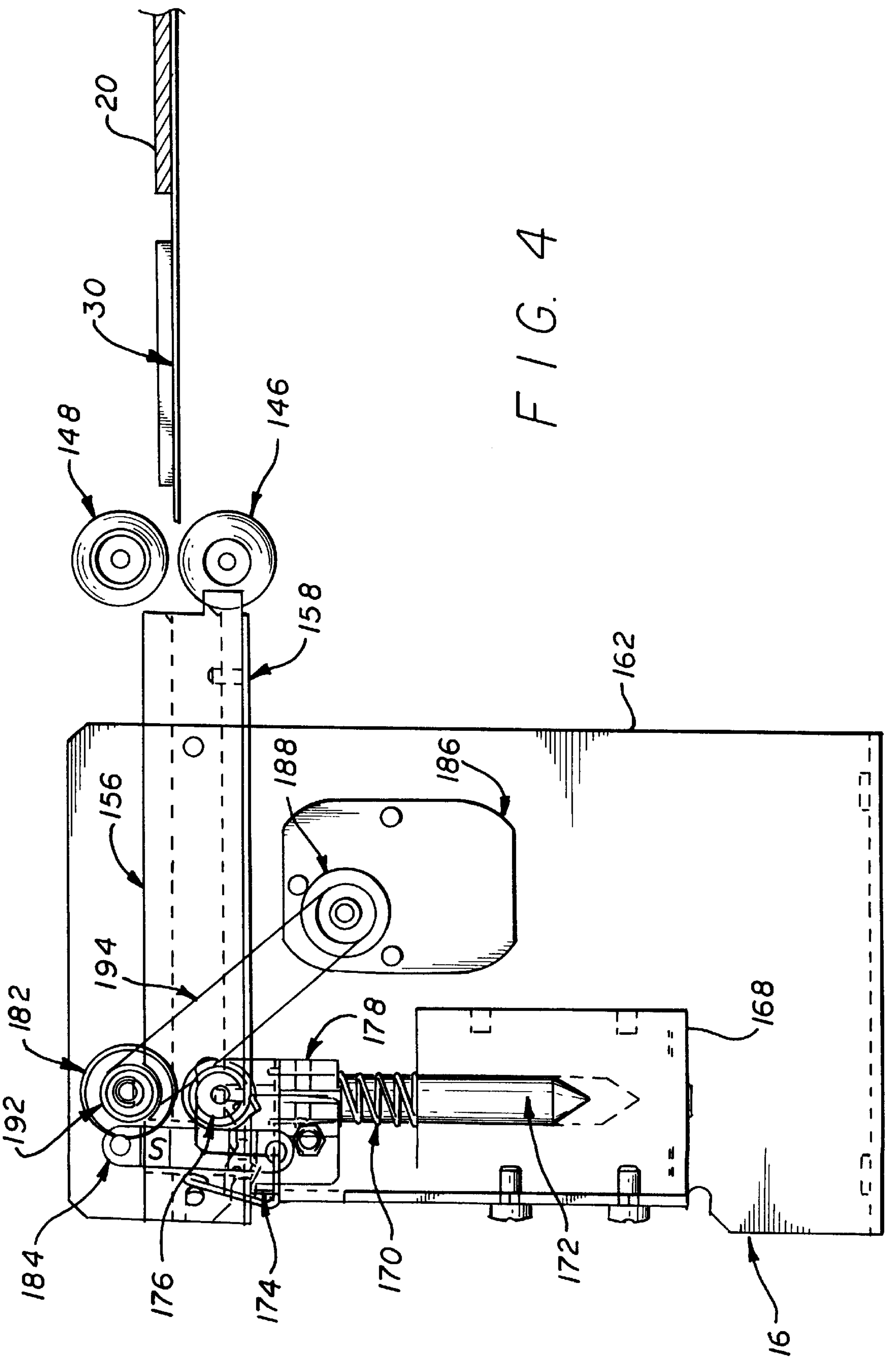
FIG. 4 is an expanded schematic view of the exit mechanism of FIG. 1.

When the portion of the PVC clear chip card 30 to be printed is beneath the print head assembly 98, the ribbon 104 is advanced in the appropriate direction by the second gearbox motor 126 until the desired color is beneath the print head assembly 98. Next, the print head assembly 98 drops down via the action of the gearbox motor 124 and cam mechanism 122, enclosing the PVC clear chip card 30 between the print head assembly 98 and a platen roller 136. The heat energized elements of the print-head (not shown) thermally transfer the dye ink and resin wax from the ribbon 104 to the PVC clear chip card 30 in the pattern formed by the heat energized elements. During this process, the PVC clear chip card 30 may be moving forward at the rate of about 0.5 inches per second, by the action of the platen roller 136. Initially, the PVC clear chip card 30 is imprinted by the yellow panel of the ribbon 104. When this is complete, the step motor 112 reverses and moves the PVC clear chip card 30 back toward the entry mechanism 12. Then the second gearbox motor 126 advances the ribbon 104 to its magenta panel, and the process is repeated. The final printing process is the cyan panel. After this multiple-pass printing process, the PVC clear chip card 30 is ejected to the exit mechanism 16 (FIG. 4) through the delrin exit guide 138 via silicone drive roller 142 which abuts pressure roller 144, and drive roller 146 which abuts pressure roller 148. Silicone drive roller 142 and drive roller 146 are driven by step motor 112 via timing belt 117 and timing belt 119.

The PVC clear chip card 30 is printed first, then the white chip card 20 is printed. The two are then mated together in the lamination process to form a laminated card printed on both sides, as discussed below. The process for printing the white chip card 20 is similar to that of the PVC clear chip card 30 and need not be described in such detail. As noted above, although in some embodiments the white chip card 20 is made of polyester, it can be made of any number of materials. Some materials do not easily accept dyes, so that any information printed on such cards must be imprinted in resin wax. Thus, in a preferred embodiment, in which the ribbon 104 has three colors of dye and black resin wax, the white chip card 20 is imprinted only with the resin wax. In operation, the white chip card 20 will be fed into the entry mechanism 12 by the card stack feeder 10, after the PVC clear chip card 30 has left the entry mechanism 12. Referring to FIG. 2, the white chip card 20 is urged forward between the delrin white entry guide 78 and the shroud plate 88 by the third silicone drive roller 92, which is driven by a motor (not shown) rotating against the third EPDM pressure roller 94. Thus the white chip card 20 is urged between the silicone cleaning roller 84 and the silicone clean drive roller 86 and cleaned of lint and other debris.

Referring to FIG. 3, the white chip card 20 passes past the photo-reflective sensor 118 and between drive roller 106 and free roller 108 as well as between delrin card guides 102. When the photo-reflective sensor 118 detects the end of the white chip card 20, the printing process begins, just as with the PVC clear chip card 30. If the white chip card 20 is made of a material that accepts the dyes on the ribbon 104, then the above-described multi-pass printing process can be used. If the white chip card 20 is made of a material that does not accept such dyes, or if the user desires a sharp single color printing, the white chip card 20 will pass under the printer only once and the ribbon 104 will advance to the resin-wax panel. After printing is complete, the white chip card 20 is advanced by the silicone drive roller 142 which abuts pressure roller 144, and drive roller 146 which abuts pressure roller 148, through the delrin exit guide 138 to the exit mechanism 16, just as with the PVC clear chip card 30.

As noted above, the PVC clear chip card 30 passes through the printer mechanism 14 and thus into the exit mechanism 16 first, followed according to a predetermined algorithm by the white chip card 20. Thus, the PVC clear chip card 30 is urged by the drive roller 146 between a pair of delrin exit guides 156, which are mounted to a stainless steel exit shroud plate 158, which in turn is mounted against a zinc-plated exit plate 162.

When the PVC clear chip card 30 completes the multi-pass printing process, a microprocessor (not shown), which controls the printing process, activates step motor 112, which turns drive roller 146 urging the white chip card 20 into the delrin exit guides 156. The microprocessor simultaneously activates a solenoid 168. The solenoid 168 is preferably a Guardian 11 DC 24VDC pull-type solenoid. The solenoid 168 has a stainless steel solenoid pin 172 which is attached to a zinc-plated steel pressure roller bracket 174, which houses an EPDIVI pressure roller 176. The solenoid pin 172 is pulled downward by the magnetic forces of the activated solenoid 168, compressing spring 170, which drops the EPDIVI pressure roller 176 down past the bottom contact surface of the delrin exit guides 156 allowing the PVC clear chip card 30 (or white chip card 20) to advance slightly past the EPDIVI pressure roller 176, as discussed below.

The exit mechanism 16 also has a reflective sensor 178 which senses the presence of the PVC clear chip card 30. In a preferred embodiment, the reflective sensor 178 is an Aleph International OH-1021 reflective sensor. When the PVC clear chip card 30 reaches the reflective sensor 178, the reflective sensor 178 detects the presence of the PVC clear chip card 30 and deactivates the solenoid 168, allowing the solenoid pin 172 to be urged upward by spring 170, moving zinc-plated steel pressure roller bracket 174 and EPDIVI pressure roller 176 upwards until EPDIVI pressure roller 176 contacts silicone exit drive roller 182. The PVC clear chip card 30 is pinched and positively held in position between the EPDIVI pressure roller 176 and the silicone exit drive roller 182 at one end of the PVC clear chip card 30, while the other end is resting at the bottom of the delrin exit guides 156.

Similarly, the white chip card 20 is feed into the delrin exit guides 156 by the drive roller 146 and the pressure roller 148 of the printer mechanism 14. Once the white chip card 20 begins to exit from the printer mechanism 14, the photoreflective sensor 118 detects the white chip card 20 leaving the print head assembly 98 and activates the solenoid 168. This causes the solenoid pin 172 to be pulled downward by the magnetic forces of the activated solenoid 168 which drops the EPDIVI pressure roller 176 and the white chip card 20 down to the bottom contact surface of the delrin exit guides 156. The white chip card 20 is still urged inward by the drive roller 146 and slides on top of the PVC clear chip card 30.

The exit mechanism 16 has an interrupt sensor 184 which detects the presence of an opaque card (such as the white chip card 20), but ignores transparent material (such as the PVC clear chip card 30). It has been found that the Optek OPB80OW interrupt sensor works well in this function. Thus, the interrupt sensor 184 will not detect the PVC clear chip card 30 but will detect the presence of the white chip card 20. Upon detection of the white chip card 20 sitting atop the PVC clear chip card 30 that preceded it, the interrupt sensor 184 deactivates the solenoid 168, resulting in the spring 170 urging the solenoid pin 172 and thus the EPDIVI pressure roller 176 upwards against the silicone exit drive roller 182, pinching the white chip card 20 and PVC clear chip card 30 between the silicone exit drive roller 182 and the EPDIVI pressure roller 176. The interrupt sensor 184 also activates gearmotor 186. Any number of motors can be used for this purpose, but Buehler 1.61.065-343 18VOC gearmotor has been found to work well. Gearmotor 186 turns zinc-casted 16-tooth pulley 188, which in turns drives zinc-casted 16-tooth pulley 192 via a kevlar-reinforced polyurethane 50-tooth timing belt 194. The silicone exit drive roller 182 and the EPDIVI pressure roller 176 thus move both the PVC clear chip card 30 and the white chip card 20 out of the delrin exit guides 156. Once the interrupt sensor 184 loses detection of the white chip card 20, a signal is sent to turn off the gearmotor 186.

Figure 5:
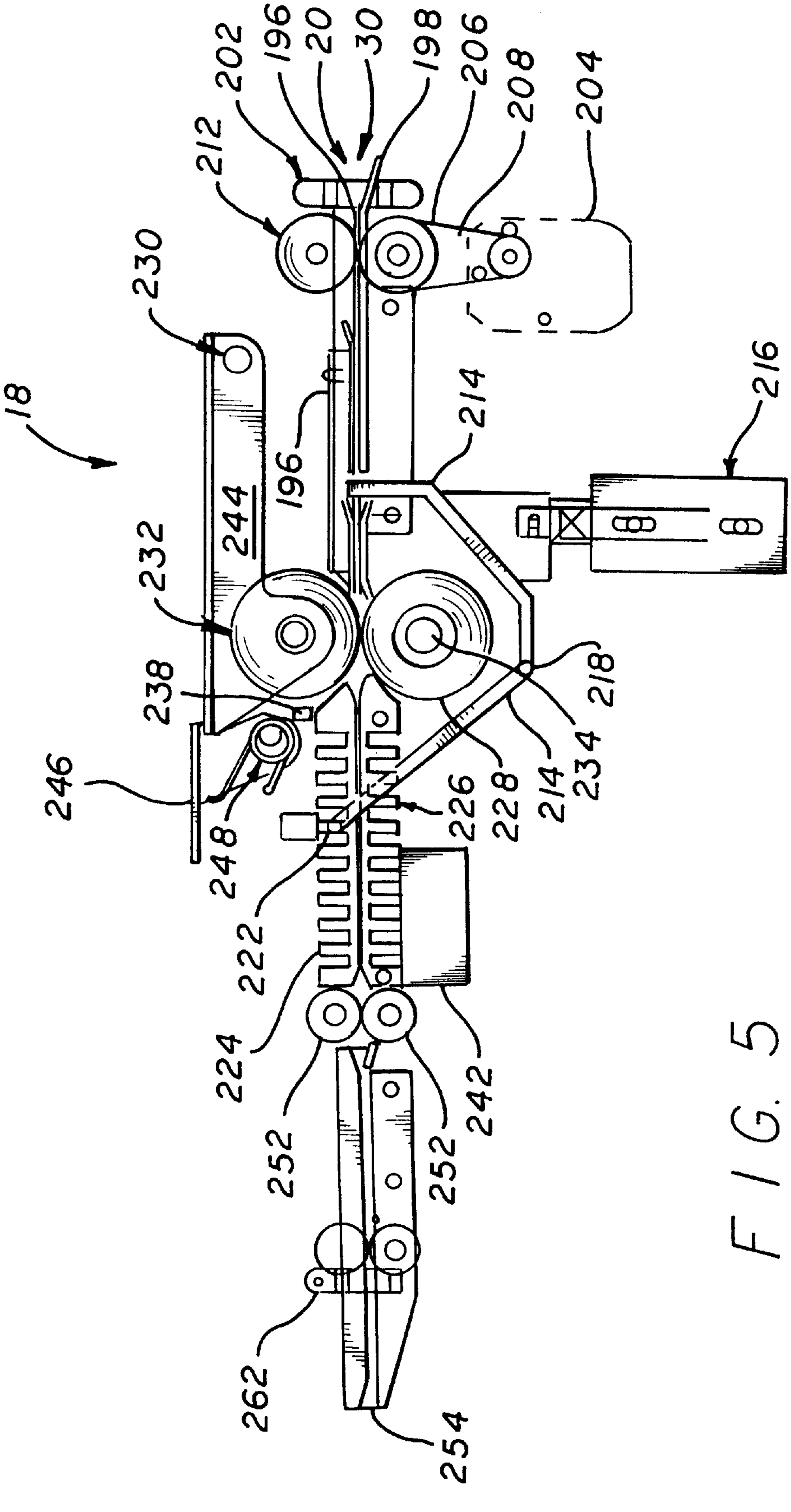
FIG. 5 is a schematic view of the laminator portion of the printer-laminator of the present invention.

Referring to FIG. 5, the laminator mechanism 18 receives the white chip card 20 atop the PVC clear chip card 30 from the exit mechanism 16 (FIG. 4), urged toward the laminator mechanism 18 by the rotation of the silicone exit drive roller 182. The cards 20 and 30 enter the laminator mechanism 18 between an upper guide plate 196 and a lower guide plate 198. An optical sensor 202 senses the presence of either the white chip card 20 or the PVC clear chip card 30 (or both, one atop the other) and activates drive motor 204. Drive motor 204 rotates lower clutched roller 206 via drive belt 208. Lower clutched roller 206 abuts and drives upper clutched roller 212 via a gear (not shown) on lower clutched roller 206 that engages a mating gear (not shown) on upper clutched roller 212. The cards are pinched between lower clutched roller 206 and upper clutched roller 212 and are thereby frictionally urged further into the laminator mechanism 18 to a stop 214.

The leading edges of the cards (20 and 30) may or may not be aligned as they are fed into the laminator mechanism 18. The leading edge of the first card to reach stop 214 comes to rest against the stop. The card (20 or 30) that is lagging will continue to feed until the leading edges of both cards rest against stop 214. After the inward progress of the cards (20 and 30) is prevented by stop 214, lower clutched roller 206 and upper clutched roller 212 will free-wheel individually and continuously. A spring-loaded friction pad (not shown) is located against the gears for the respective rollers, creating independent friction clutches between the gears and both rollers.

The leading edges of white chip card 20 and PVC clear chip card 30 are aligned by coming to rest against stop 214. After a predetermined time period, typically 5–10 seconds, solenoid 216 is activated. It has been found that a period of approximately five seconds is adequate for the two cards to properly align, and thus that interval is utilized in a preferred embodiment. Solenoid 216 can comprise any number of commercially available pull-type solenoids, spring-loaded in the up position, but in a preferred embodiment is the Guardian II-I-24vdc solenoid. Solenoid 216 is connected to stop 214, and activation of solenoid 216 causes the stop 214 to be retracted. As the upper edge of the stop 214 clears the cards (20 and 30), the cards continue to be pinched together and frictionally fed forward by lower clutched roller 206 and upper clutched roller 212, simultaneously.

The stop 214 is a rigid U-shaped member, pivotally mounted to the frame (not shown) at link pivot point 218, with one end of stop 214 extending to upper guide plate 196 and the other end of stop 214 extending to a heat sink pivot point 222, where the stop 214 is pivotally mounted to an upper heat sink 224. Thus, the stop 214 couples the solenoid 216 to the upper heat sink 224, with a single unitary, rigid structure. As solenoid 216 is retracted, stop 214 rotates about link pivot point 218, lifting upper heat sink 224 up and away from an adjacent fixed lower heat sink 226.

Fusion (lamination) of the two cards takes place continuously under heat and pressure as the mated cards (20 and 30) are fed between a heat roller 228 and a pressure roller 232. Each set of mated cards passes through heat roller 228 and pressure roller 232 in approximately 50 seconds. It has been found that best results occur when the heat roller 228 is heated to about 180 degrees centigrade, and exerts a constant pressure of about ten pounds. To ensure constant pressure on the cards being laminated, pressure roller 232 is mounted on a movable bracket 244 which is engaged by a spring-loaded latch 246. Roller pressure is adjusted across the cards by rotating and locking either of two eccentric pivot pins 248, one of which is located on the face of the laminator mechanism 18 shown in FIG. 5, and the other on the opposite side of the laminator mechanism 18. Each eccentric pivot pin 248 has a cam like head such that turning the eccentric pivot pin 248 will raise or lower the latching surfaces of spring-loaded latch 246 and thus the pressure roller 232. Thus the eccentric pivot pins 248 control the "gap" or pressure on the card. The two eccentric pivot pins 248 are bolted to the sides of the laminator frame.

The heat roller 228 has a heater core 234 consisting of Boon AC Heater Rod. Roller 232 is rotated by a step motor (not shown) linked to the pressure roller 232 by a chain (not shown). The heat and pressure laminate white chip card 20 to PVC clear chip card 30.

To allow removal of a jammed card from the laminating area, pressure roller 232 may be unlatched and rotated back about pivot pin 230. If required to clear the jam, guide plate 196 and the upper heat sink 224 may be manually removed.

A now-laminated card 258 is fed by the heat and pressure rollers onto the surface of fixed lower heat sink 226. After a predetermined period of time, typically five seconds, when the trailing edge of the laminated card clears the heat roller 228, the card stops on the fixed lower heat sink 226, and the upper heat sink 224 lowers into position, cools the card for approximately thirty seconds, and then rises before the card is again moved by the first roller pair 252. During this cooling period the laminated card 258 is entirely within the heat sinks, except for a small portion between the first roller pair 252. As stop 214 then rotates about link pivot point 218, the upper heat sink 224 lowers onto the upper surface of the laminated card for subsequent heat transfer from the card to both upper heat sink 224 and fixed lower heat sink 226. Intermittently raising (and lowering) the upper heat sink 224 flattens the cards. The upper heat sink 224 remains in this lowered position until the next card laminating process is started. The upper heat sink 224 and fixed lower heat sink 226 cover the width of the laminated card 258.

To eliminate distortion of the laminated card by ensuring that the heat is removed from the card uniformly (i.e., that the temperature difference across the card from leading edge to trailing edge is minimized as it is cooled by upper heat sink 224 and fixed lower heat sink 226), a heat pump 242 is provided for removing heat from the lower heat sink 226, and is energized by sensor 238. Any number of commercially available heat pumps may be employed. Heat pump 242 is mechanically attached to fixed lower heat sink 226.

After passing between the upper heat sink 224 (in a lowered position) and the fixed lower heat sink 226, the laminated card is urged out of the laminator mechanism 18 by two matched pairs of rollers, a first roller pair 252 and a second roller pair 254. Each roller pair consists of a drive roller, driven by a motor (not shown) and a pressure roller. After passing through the second roller pair 254, the laminated card passes out of the laminator mechanism 18.

FIGS. 6 and 7 show the die-cutter mechanism 256 of the present invention. The die-cutter mechanism 256 is adjacent to the exit side of the laminator mechanism 18 (FIG. 5), and receives a laminated card 258 therefrom. The die-cutter mechanism 256 has a rotating cutter 266 for trimming laminated cards 258, and a rotating anvil 264 for providing a cutting surface for the rotating cutter 266. Additionally, both the rotating anvil 264 and the rotating cutter 266 rotate in opposite directions against each other, with rotational force provided by a motor 268 through a series of gears (not shown), urging the laminated card 258 through the die-cutter mechanism 256.

The rotating cutter 266 has a circumferential cutting blade 272 which forms a closed loop on the surface of the rotating cutter 266 in the desired shape and size of the finished card. In a preferred embodiment, the circumferential cutting blade 272 forms a generally rectangular berm wrapping around about one/half of the circumference of the surface of the rotating cutter 266. Within the surface area formed by the circumferential cutting blade 272 is a rubber padding 274 which provides friction to keep the laminated card 258 moving with the rotating cutter 266 and the rotating anvil 264. A homing wheel 276, for tracking the position of the circumferential cutting blade 272 is connected to and rotates with the rotating cutter 266. The homing wheel 276 has a start point (not shown), ideally a 0.06 inch wide slot on the homing wheel 276. The start point generally corresponds to the leading edge of the circumferential cutting blade 272 located approximately ten degrees off of top dead center, as illustrated in FIG. 6. This allows the leading edge of the laminated card 258 to be inserted between the rotating cutter 266 and the rotating anvil 264 just ahead of the circumferential cutting blade 272, causing the leading edge of the circumferential cutting blade 272 to cut of a portion of the leading edge of the laminated card 258. In alternative embodiments, the start point can be a magnetically active or color coded point on the homing wheel 276.

A homing sensor 278, of the opto interrupt type, is provided for sensing the start point and signaling the motor 268 to stop when the circumferential cutting blade 272 is in the proper starting position (ten degrees off of top dead center).

As the laminated card 258 initially enters the die-cutter mechanism 256, it is still driven by the second roller pair 254. Upon entering the die-cutter mechanism 256, the trailing end of the laminated card 258, which is still in the laminator mechanism 18, triggers opto interrupt sensor 262 (FIG. 5). Sensor 262 signals motor 268 to rotate until the homing sensor 278 signals that the laminated card 258 is in the above-described starting position, at which point the homing sensor 278 signals the motor 268 to stop.

When the laminated card 258 moves into the die-cutter mechanism 256 such that it contacts the rotating cutter 266 and the rotating anvil 264, the sensor 262 (FIG. 5) signals motor 264 to rotate the rotating anvil 264 and the rotating cutter 266. That rotation urges the laminated card 258 inward as the circumferential cutting blade 272 cuts the laminated card 258 against the rotating anvil 264.

As the rotating anvil 264 and rotating cutter 266 rotate, the laminated card 258 is trimmed to size as it is wedged between the circumferential cutting blade 272 and the rotating anvil 264. The laminated card 258 is fed forward by two friction components, the wedging action of the circumferential cutting blade 272 against the rotating anvil 264 and the friction applied to the laminated card 258 by the (compressed) rubber padding 274 as the laminated card 258 is pressed between the rubber padding 274 and the surface of the rotating anvil 264.

When the homing sensor 278 detects that the rotating cutter 266 and circumferential cutting blade 272 has complete a rotation and returned to the starting position, the homing sensor 278 signals the motor 268 to turn off and the die-cutter mechanism 256 is ready for another laminated card.

The rotating anvil 264 is free to float vertically as it rotates due in bearings 282. Similarly, rotating cutter 266 rotates in bearings 284. Bearings 282 are pressed into bearing blocks 286, which are free to float vertically in side frames 288. Because of the large amount of energy required to cut these cards, a means of applying a heavy force between rotating anvil 264 and rotating cutter 266 is required. This force is increased by tightening screws 292 against the bearing blocks 286.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following claims.

What is claimed is:

1. A printer and laminator for printing information on a print media and laminating the print media to thermoplastic material, comprising:

input means for directing print media and thermoplastic material into the printer laminator;

print means having a single print head capable of printing on both the thermoplastic material and on the print media;

lamination means for fusing the thermoplastic material to the print media; and output means for directing the laminated product out of the printer laminator.

2. The printer and laminator of claim 1 wherein the output means comprises at least one rotary cutter for trimming the laminated printed end product into a predetermined size and shape.

3. The printer and laminator of claim 1 wherein the lamination means comprises a heated roller for laminating the print media to the thermoplastic material while moving through the printer and laminator device.

4. The printer and laminator of claim 1 wherein the single print head prints first on the thermoplastic material and then on the print media.

5. The printer and laminator of claim 1 wherein the single print head prints first on the print media and then on the thermoplastic material.

6. The printer and laminator of claim 2 wherein the output means further comprises at least two rotary cutters for trimming laminated cards to a predetermined size.

7. An apparatus for printing on media and laminate and fusing the printed media and laminate together, said apparatus comprising:

a print assembly having at least one printhead for printing on said media and on said laminate in a pre-determined order;

a feeder mechanism for feeding said media and said laminate into said print assembly in accordance with said pre-determined order;

means for aligning said printed media and laminate in overlying fashion; and laminator mechanism for receiving and fusing said aligned printed media and laminate together under heat and pressure to produce a laminated article.

8. The apparatus of claim 7, wherein said laminator mechanism includes at least one pair of heat and pressure rollers for receiving and holding said aligned printed media and laminate between said heat and pressure rollers over a period of time to produce said laminated article.

9. The apparatus of claim 8, wherein said laminator mechanism further includes means for mounting said pressure roller to ensure constant pressure on said received aligned printed media and laminate.

10. The apparatus of claim 9, wherein said pressure roller mounting means includes a movable bracket for mounting said pressure roller, said movable bracket coupled to a spring-loaded latch, and at least one eccentric pivot pin operatively coupled to said spring-loaded latch for controlling the pressure on said received aligned printed media and laminate.

11. The apparatus of claim 8, wherein said laminator mechanism further includes means for driving said pressure roller.

12. The apparatus of claim 11, wherein said pressure roller driving means includes a step motor operatively coupled to said pressure roller.

13. The apparatus of claim 8, wherein said laminator mechanism further includes means for cooling said laminated article.

14. The apparatus of claim 13, wherein said cooling means includes at least one heat sink proximate said at least one pair of heat and pressure rollers for cooling said laminated article and a heat pump for removing heat from said at least one heat sink to prevent distortion of said laminated article.

15. The apparatus of claim 14, wherein said laminator mechanism further includes means for removing a jammed laminated article.

16. The apparatus of claim 15, wherein said means for removing a jammed laminated article includes a latch for unlatching said pressure roller and a pivot pin disposed away from said latch for rotating said unlatched pressure roller away from said laminated article to allow removal of said jammed laminated article, said at least one heat sink adapted for manual removal.

17. The apparatus of claim 14, further comprising means for directing said cooled laminated article out of said laminator mechanism.

18. The apparatus of claim 17, wherein said directing means includes at least one pair of rollers for urging said cooled laminated article out of said laminator mechanism.

19. The apparatus of claim 17, wherein said feeder mechanism includes a first feeder assembly for feeding laminate stock into said print assembly and a second feeder assembly for feeding media stock into said print assembly in accordance with said predetermined order.

20. The apparatus of claim 18, further comprising means for trimming said laminated article.

21. The apparatus of claim 20, wherein said trimming means includes a die-cutter mechanism for receiving and trimming laminated articles urged out of said laminator mechanism by said at least one pair of directing rollers.

22. The apparatus of claim 7, further comprising a cleaning mechanism coupled between said print assembly and said feeder mechanism for cleaning said laminate and said media in accordance with said pre-determined order.

23. The apparatus of claim 19, further comprising a cleaning mechanism coupled between said print assembly and said first feeder assembly for cleaning said laminate and said media in accordance with said pre-determined order, said second feeder assembly operatively coupled to said first feeder assembly.

24. An apparatus for printing on media and laminate and fusing the printed media and laminate together, said apparatus comprising:

a print assembly having at least one printhead for printing on said media and on said laminate in a pre-determined order;

a first feeder assembly for feeding said laminate into said print assembly for printing in accordance with said pre-determined order;

a second feeder assembly for feeding said media into said print assembly for printing in accordance with said pre-determined order;

means for aligning said printed media and laminate in overlying fashion; and laminator mechanism for receiving and fusing said aligned printed media and laminate together under heat and pressure to produce a laminated article.

25. The apparatus of claim 24, wherein said laminator mechanism includes at least one pair of heat and pressure rollers for receiving and holding said aligned printed media and laminate between said heat and pressure rollers over a period of time to produce said laminated article.

26. The apparatus of claim 25, wherein said laminator mechanism further includes means for mounting said pressure roller to ensure constant pressure on said received aligned printed media and laminate.

27. The apparatus of claim 26, wherein said pressure roller mounting means includes a movable bracket for mounting said pressure roller, said movable bracket coupled to a spring-loaded latch, and at least one eccentric pivot pin operatively coupled to said spring-loaded latch for controlling the pressure on said received aligned printed media and laminate.

28. The apparatus of claim 25, wherein said laminator mechanism further includes means for driving said pressure roller.

29. The apparatus of claim 28, wherein said pressure roller driving means includes a step motor operatively coupled to said pressure roller.

30. The apparatus of claim 25, wherein said laminator mechanism further includes means for cooling said laminated article.

31. The apparatus of claim 30, wherein said cooling means includes at least one heat sink proximate said at least one pair of heat and pressure rollers for cooling said laminated article and a heat pump for removing heat from said at least one heat sink to prevent distortion of said laminated article.

32. The apparatus of claim 31, wherein said laminator mechanism further includes means for removing a jammed laminated article.

33. The apparatus of claim 32, wherein said means for removing a jammed laminated article includes a latch for unlatching said pressure roller and a pivot pin disposed away from said latch for rotating said unlatched pressure roller away from said laminated article to allow removal of said jammed laminated article, said at least one heat sink adapted for manual removal.

34. The apparatus of claim 31, further comprising means for directing said cooled laminated article out of said laminator mechanism.

35. The apparatus of claim 34, wherein said directing means includes at least one pair of rollers for urging said cooled laminated article out of said laminator mechanism.

36. The apparatus of claim 35, further comprising means for trimming said laminated article.

37. The apparatus of claim 36, wherein said trimming means includes a die-cutter mechanism for receiving and trimming laminated articles urged out of said laminator mechanism by said at least one pair of directing rollers.

38. The apparatus of claim 24, further comprising a cleaning mechanism coupled between said print assembly and said first feeder assembly for cleaning said laminate and said media in accordance with said pre-determined order, said second feeder assembly operatively coupled to said first feeder assembly.

39. An apparatus for printing on media and laminate and fusing the printed media and laminate together, said apparatus comprising:

a print assembly having at least one printhead for printing on said media and on said laminate in a pre-determined order;

a first feeder assembly for feeding said laminate into said print assembly for printing in accordance with said pre-determined order;

a second feeder assembly for feeding said media into said print assembly for printing in accordance with said predetermined order;

means for aligning said printed media and laminate in overlying fashion; and at least one pair of heat and pressure rollers for receiving and holding said aligned printed media and laminate between said heat and pressure rollers over a period of time to produce a laminated article.

40. The apparatus of claim 39, further comprising means for mounting said pressure roller to ensure constant pressure on said received aligned printed media and laminate.

41. The apparatus of claim 40, wherein said pressure roller mounting means includes a movable bracket for mounting said pressure roller, said movable bracket coupled to a spring-loaded latch, and at least one eccentric pivot pin operatively coupled to said spring-loaded latch for controlling the pressure on said received aligned printed media and laminate.

42. The apparatus of claim 39, further comprising means for driving said pressure roller.

43. The apparatus of claim 42, wherein said pressure roller driving means includes a step motor operatively coupled to said pressure roller.

44. The apparatus of claim 39, further comprising means for cooling said laminated article.

45. The apparatus of claim 44, wherein said cooling means includes at least one heat sink proximate said at least one pair of heat and pressure rollers for cooling said laminated article and a heat pump for removing heat from said at least one heat sink to prevent distortion of said laminated article.

46. The apparatus of claim 45, further comprising means for removing a jammed laminated article.

47. The apparatus of claim 46, wherein said means for removing a jammed laminated article includes a latch for unlatching said pressure roller and a pivot pin disposed away from said latch for rotating said unlatched pressure roller away from said laminated article to allow removal of said jammed laminated article, said at least one heat sink adapted for manual removal.

48. The apparatus of claim 45, further comprising means for directing said cooled laminated article out of said at least one heat sink.

49. The apparatus of claim 48, wherein said directing means includes at least one pair of rollers for urging said cooled laminated article out of said at least one heat sink.

50. The apparatus of claim 49, further comprising means for trimming said laminated article.

51. The apparatus of claim 50, wherein said trimming means includes a die-cutter mechanism for receiving and trimming laminated articles urged out of said at least one heat sink by said at least one pair of directing rollers.

52. The apparatus of claim 39, further comprising a cleaning mechanism coupled between said print assembly and said first feeder assembly for cleaning said laminate and said media in accordance with said pre-determined order, said second feeder assembly operatively coupled to said first feeder assembly.

* * * * *

UNITED STATES PATENT AND TRADEMARK OFFICE

CERTIFICATE OF CORRECTION

PATENT NO. : 6,296,032 B1
DATED : October 2, 2001
INVENTOR(S) : Danny Louie et al.

It is certified that error appears in the above-identified patent and that said Letters Patent is hereby corrected as shown below:

Title page,
Item [73], Assignee, should read -- ZIH Corp., a Delaware Corporation with it's principal office in Hamilton, Bermuda. --

Signed and Sealed this

Fourth Day of November, 2003

JAMES E. ROGAN
*Director of the United States Patent and Trademark Office*